(12) United States Patent
Xu (10) Patent No.: US 8,302,349 B2
(45) Date of Patent: Nov. 6, 2012

(54) RESCUE PASSAGE WINDOW FOR PASSENGER TRAIN

(75) Inventor: Xiaogang Xu, Hebei (CN)

(73) Assignee: Tangshan Railway Vehicle Co., Ltd., Hebei (CN)

( * ) Notice: Subject to any disclaimer, the term of this patent is extended or adjusted under 35 U.S.C. 154(b) by 0 days.

(21) Appl. No.: 13/174,411

(22) Filed: Jun. 30, 2011

(65) Prior Publication Data

US 2011/0271599 A1 Nov. 10, 2011

Related U.S. Application Data

(63) Continuation of application No. PCT/CN2010/073504, filed on Jun. 3, 2010.

(30) Foreign Application Priority Data

May 10, 2010 (CN) .......................... 2010 1 0167074

(51) Int. Cl.
*E05D 7/00* (2006.01)
(52) U.S. Cl. ............................... 49/397; 49/398; 49/400
(58) Field of Classification Search .................... 49/141, 49/394, 397, 398, 400, 401
See application file for complete search history.

(56) References Cited

U.S. PATENT DOCUMENTS

| | | | | |
|---|---|---|---|---|
| 2,793,722 A | * | 5/1957 | Bingham | 49/141 |
| 2,830,843 A | * | 4/1958 | Seaburg et al. | 49/449 |
| 3,927,492 A | * | 12/1975 | Carson | 49/141 |
| 3,942,286 A | * | 3/1976 | Ehret et al. | 49/141 |
| 4,283,885 A | * | 8/1981 | Remick et al. | 49/466 |
| 4,313,280 A | * | 2/1982 | Ehret et al. | 49/141 |
| 5,136,812 A | * | 8/1992 | Voegele | 49/397 |
| 5,542,215 A | * | 8/1996 | Kubo | 49/397 |
| 5,787,643 A | * | 8/1998 | Schmuck | 49/141 |
| 5,893,600 A | * | 4/1999 | McManus | 296/146.16 |
| 5,941,022 A | * | 8/1999 | Schmuck | 49/141 |
| 6,340,202 B1 | * | 1/2002 | Stanton et al. | 296/201 |

(Continued)

FOREIGN PATENT DOCUMENTS

CN 2117295 9/1992

(Continued)

*Primary Examiner* — Jerry Redman
(74) *Attorney, Agent, or Firm* — J.C. Patents (57) ABSTRACT

The present invention provides a rescue passage window for a passenger train, comprising an aluminum alloy outer frame, a hollow tempered glass, a movable sash, a fixed sash, a locking device, a rotating device and a sealing device, the aluminum alloy outer frame is a carrier to connect the structures of any other parts, the hollow tempered glass is inlaid on the aluminum alloy outer frame by the sealing device to form the fixed sash and the movable sash, the movable sash is suspended on the cross beam of the aluminum alloy outer frame by the rotating device to realize its connection with the aluminum alloy outer frame, reliable locking between the movable sash and the aluminum alloy outer frame is realized by the locking device, connection and sealing between the movable sash and the aluminum alloy outer frame is realized by the sealing device. The movable sash of the window of the present invention adopts the turnover structure, and the passing size after the movable sash is turned over can reach 970×600 mm, so that the rescue passage window can fully realize the function of smooth passing of stretchers for the wounded.

10 Claims, 6 Drawing Sheets

U.S. PATENT DOCUMENTS

| | | | |
|---|---|---|---|
| 6,412,225 B1 * | 7/2002 | McManus | 49/381 |
| 6,726,271 B2 * | 4/2004 | Stanton et al. | 296/146.15 |
| 7,730,668 B2 * | 6/2010 | Dankert et al. | 49/141 |
| 2003/0057733 A1 * | 3/2003 | Carson et al. | 296/146.15 |
| 2006/0130403 A1 * | 6/2006 | Krehbiel et al. | 49/141 |
| 2007/0018481 A1 * | 1/2007 | Schmucker | 296/146.16 |
| 2007/0283626 A1 * | 12/2007 | Neto | 49/141 |
| 2009/0267382 A1 * | 10/2009 | Smith et al. | 296/146.15 |

FOREIGN PATENT DOCUMENTS

| | | |
|---|---|---|
| CN | 2782879 | 5/2006 |
| CN | 2816284 | 9/2006 |
| CN | 201021584 | 2/2008 |
| CN | 101660390 | 3/2010 |
| DE | 4006709 A1 * | 9/1991 |
| EP | 61198 A1 * | 9/1982 |
| WO | WO 2008/140426 | 11/2008 |

* cited by examiner

RESCUE PASSAGE WINDOW FOR PASSENGER TRAIN

CROSS-REFERENCE TO RELATED APPLICATIONS

This application is a continuation of the international application No. PCT/CN2010/073504 filed on Jun. 3, 2010, which claims the priority benefits of Chinese application No. 201010167074.6 filed on May 10, 2010. The contents of those prior applications are hereby incorporated by reference in their entirety.

FIELD OF THE TECHNOLOGY

The present invention relates to the field of passenger train body parts, in particular to a rescue passage window for a passenger train.

BACKGROUND

Figure 1:
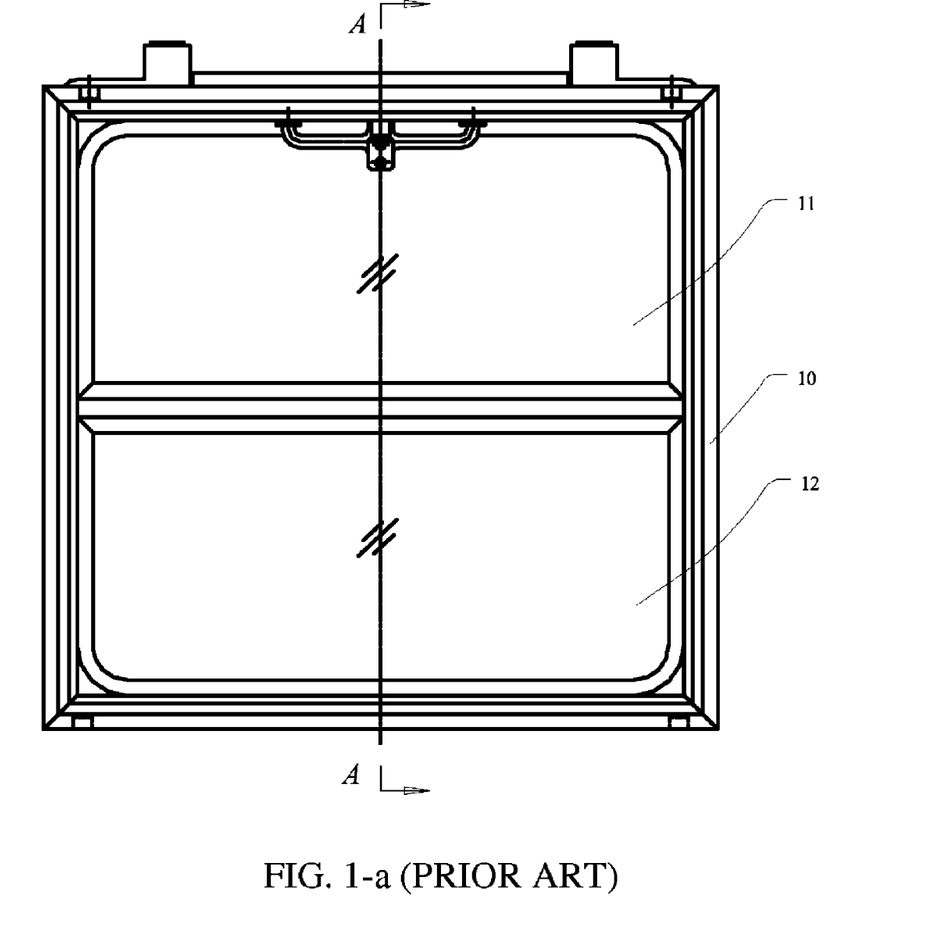

The passenger train windows are arranged for realizing ventilation, lighting, evacuation and other basic passenger transport functions of the train, which mainly including two types: the pushup type window and the pushdown type window. FIG. 1-a, FIG. 1-b and FIG. 1-c are respectively a schematic structural diagram, a A-A cut-open view and a partial enlarged view of the pushdown type window. The pushdown type window mainly comprises an outer frame 10, a movable sash 11, a fixed sash 12 and a sealing strip 13, and the movable sash can be pulled vertically, thereby realizing the ventilation function of the carriage after the movable sash is open. However, the passing size of the window with this structure can only reaches 900×350 mm after the window is completely open, and the window can only realizes the basic passenger transport function of the train under normal circumstances and do not have the function of being used as a stretcher transport channel for the wounded under the rescue circumstance. The prior art solves the above problems by manufacturing the special-purpose disaster relief passenger train for the emergency rescue, and this solution is not only having the disadvantage of high cost, but also is usually idled and causing great resource waste.

SUMMARY

The technical problem that the present invention will solve is to provide a rescue passage window for a passenger train with a dual function of the basic passenger transport and disaster relief, which can solve the problem that the prior passenger train window do not have the function of being used as a stretcher transport channel for the wounded under the emergency circumstance.

In order to solve the above problem, the present invention discloses a rescue passage window for a passenger train, comprising an aluminum alloy outer frame, hollow tempered glass, a movable sash, a fixed sash, a locking device, a rotating device and a sealing device, wherein the aluminum alloy outer frame is a carrier to connect the structures of any other parts; the hollow tempered glass is inlaid on the aluminum alloy outer frame by the sealing device to form the fixed sash and the movable sash; the movable sash is suspended on the cross beam of the aluminum alloy outer frame by the rotating device to realize its connection with the aluminum alloy outer frame; reliable locking between the movable sash and the aluminum alloy outer frame is realized by the locking device; connection and sealing between the movable sash and the aluminum alloy outer frame is realized by the sealing device.

In the preferred embodiment, the aluminum alloy outer frame is formed by extruding the aluminum alloy profile by using a large pressing machine, after aging treatment, four corners are bent by the simmer bending mould, and finally the mouthpiece is welded and polished.

In the preferred embodiment, the aluminum alloy outer frame is also provided with a rapid tightening blocks for rapidly tightening the rescue passage window to the passenger train body.

In the preferred embodiment, the hollow tempered glass comprises external tempered glass, a middle air layer and internal tempered glass, with thicknesses of 8 mm, 6 mm and 5 mm or 5 mm, 9 mm and 5 mm respectively, wherein the external tempered glass and the internal tempered glass are supported by an aluminum alloy molecular sieve on the edge, and are adhered by a sealant, and a drying agent is arranged inside the aluminum alloy molecular sieve.

In the preferred embodiment, the fixed sash and the movable sash comprise aluminum alloy frames, hollow tempered glass and glass sealing joint strip; the aluminum alloy frames are formed by extruding the aluminum alloy profile by the large pressing machine, after aging treatment, four corners are bent by the simmer bending mould, and finally the mouthpiece is welded and polished; the hollow tempered glass is inlaid onto the aluminum alloy frames through the glass sealing joint strip, wherein the inlaying clearance is 2.5 mm to 3.5 mm, and the preserved compression amount is 2 mm to 3 mm.

In the preferred embodiment, the passing size after the movable sash is open is 970×600 mm.

In the preferred embodiment, the locking device comprises a lock body, a lock core, a lock tongue and a locking plate, the lock body, the lock core and the lock tongue are inlaid inside the frame of the movable sash, and the locking plate is inlaid onto the corresponding position of the aluminum alloy outer frame; the lock tongue is provided with a side opening, thereby realizing the locking limit to the movable sash and the compression to the movable sash when the lock core drives the lock tongue to revolve into the locking plate.

In the preferred embodiment, the rotating device comprises an internal axle and a sleeve, the internal axle is arranged on the cross beam in the middle of the window, the sleeve is arrange on the frame of the movable sash, and the internal axle and the sleeve are formed by machining the matrix of the aluminum alloy profile.

In the preferred embodiment, the rotating device also comprises a limit part so that the movable sash can revolves and can be fixed at the position of 140-160 degrees.

In the preferred embodiment, the sealing device comprises a glass sealing joint strip and a sealing joint strip between the movable sash and the aluminum alloy outer frame; the sealing joint strip is the ethylene-propylene diene copolymer sealing joint strip.

Compared to the prior art, the invention has the following advantages:

The movable sash of the present invention adopts the turnover structure, the turnover angle can reach 140-160 degrees, and the passing size after the movable sash is turned over can reach 970×600 mm, so that the rescue passage window can fully realize the function of smooth passing of stretchers for the wounded.

With the locking mechanism and the sealing device, the rescue passage window for the passenger train of the present invention can realize the basic functions such as ventilation, lighting, escape and thermal insulation and also good water tightness, air tightness, wind pressure resistance, sound insulation, thermal insulation and other properties.

Compared to the special-purpose rescue train, the rescue passage window for the passenger train of the present invention has the advantages of low cost and no resource waste; take one carriage with six rescue passage windows for example, the solution of the present invention costs about 15000-20000$, while manufacturing a special-purpose rescue carriage costs about 2000,000$.

When the disaster relief requires, the rescue passage window for the passenger train of the present invention can be widely installed in the existing rolling stock such as 25G/T head seat, hard sleeper, soft sleeper and dinner carriages of China railway, thereby having the advantages of good adaptability and strong practicability.

In addition, the rescue passage window for the passenger train is similar with the traditional train window in appearance, thereby can meet the disguise requirement under the specific condition.

BRIEF DESCRIPTION OF THE DRAWINGS

FIG. 1-*a* is the schematic structural diagram of the prior passenger train window;

FIG. 1-*b* is the A-A section schematic structural diagram;

FIG. 1-*c* is the partial enlarged view for the circle part in FIG. 1-*b*;

FIG. 2-*a* is the schematic structural diagram for the embodiment of the rescue passage window for the passenger train.

FIG. 2-*b* is the B-B section schematic structural diagram of FIG. 2-*a*;

FIG. 2-*c* the partial enlarged view for the circle part in FIG. 2-*b*.

DETAILED DESCRIPTION

In order to ensure that the above purpose, characteristics and advantages of the invention can be more obviously and easily to understand, the present invention will be further described through the embodiments with reference to the drawings.

Figure 2:
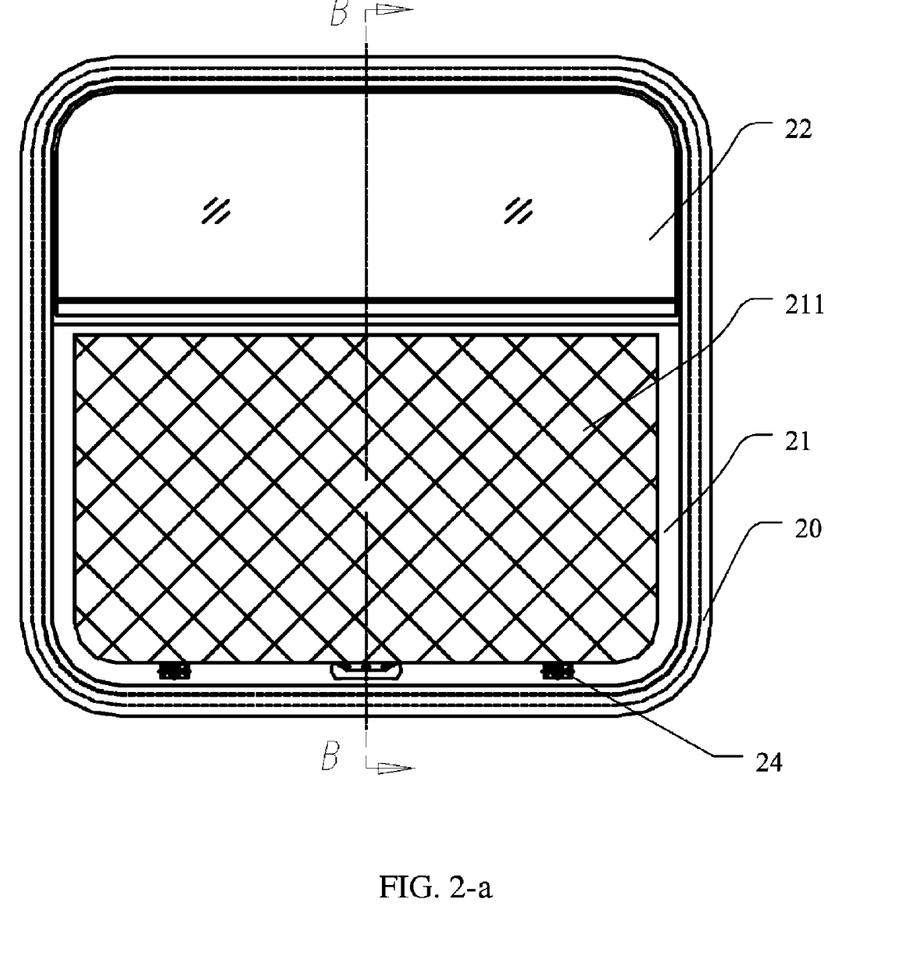

FIG. 2-*a*, FIG. 2-*b* and FIG. 2-*c* are the structural diagram of the rescue passage window for the passenger train of the present invention. The rescue passage window for the passenger train comprises an aluminum alloy outer frame 20, hollow tempered glass 25, a movable sash 21 and a fixed sash 22, a locking device 24, a rotating device 26 and a sealing device 23, wherein, the aluminum alloy outer frame 20 is a main carrier to connect the structures of any other parts; the hollow tempered glass 25 is inlaid on the aluminum alloy outer frame 20 by a sealing joint strip 23, the upper half part of the whole window after inlaying forms the upper fixed sash 22; the lower movable sash 21 is suspended on the cross beam of the outer frame 20 by the rotating device 26, and sealing is realized by the sealing joint strip 23 between the movable sash 21 and the aluminum alloy outer frame 20 after the movable sash 21 is closed; connection between the outer frame 20 and the movable sash 21 is realized by the rotating device 26; reliable locking between the movable sash 21 and the lower part of the outer frame 20 is realized by the locking device 24; the sealing device 23 is mainly used for realizing connection and sealing between the glass 25 and the outer frame 20, and between the movable sash 21 and the outer frame 20.

In the figure, the part 211 is the rescue stretcher passing area, the size of which is 970×600 mm.

It is necessary to explain that in the figure, the position of the movable sash 21 at the lower part of the window body, and the position of the fixed sash 22 at the upper part of the window body, but should not be interpreted as limits to the present invention.

Hereinafter, the implementation process of all above parts will be described in detail:

Aluminum alloy outer frame 20: the main body of the aluminum alloy outer frame 20 is the aluminum alloy profile, and the section design of which must meet the following requirements: reliably connect the outer frame with the steel train body, ensure the sealing performance between the outer frame 20 and the train body after installation, meet the requirements of the reliable limit between the movable sash 21 and the outer frame after the movable sash is closed, meet the requirements of sealing of the connecting part between the movable sash 21 and the outer frame 20, meet the requirements of the inlaying and compression space of the sealing joint strip 23, and meet the rigidity and strength requirements of the entire window. The specific implementation process comprises: the outer frame 20 is formed by extruding the aluminum alloy profile by using the large pressing machine, after aging treatment (for eliminating the internal stress to stabilize the texture and size of the profile), four corners are bent by the simmer bending mould, and finally the mouthpiece is welded and polished. After the outer frame is formed integrally, the surface of which should be oxidized to realize the mellow appearance effect. In addition, the aluminum alloy outer frame 20 is provided with 16 rapid tightening blocks 28 in order to rapidly tighten the rescue passage window to the passenger train body.

Hollow tempered glass 25: in the preferred embodiment, the main structure of the hollow tempered glass 25 is composed of external tempered glass, a middle air layer and internal tempered glass, with thicknesses of 8 mm, 6 mm and 5 mm respectively. In the other preferred embodiment, the main structure of the hollow tempered glass 25 is composed of external tempered glass, a middle air layer and internal tempered glass, with thicknesses of 5 mm, 9 mm and 5 mm respectively. The specific implementation process comprises: the external tempered glass and the internal tempered glass are supported by an aluminum alloy molecular sieve 27 on the edge, and are adhered by a sealant, wherein a drying agent is arranged inside the molecular sieve to prevent the middle air layer from condensing water mist with the temperature changes.

Movable sash 21 and fixed sash 22: the structure of the lower movable sash 21 is basically the same as that of the upper fixed sash 22, which are mainly inlaid by aluminum alloy profile frames, glass sealing joint strips and hollow tempered glass. The specific implementation process comprises: the forming and bending process of the aluminum alloy frame profile is the same as that of the aluminum alloy outer frame profile 20; the hollow tempered glass is inlaid onto the aluminum profile frame of the sash through the ethylene-propylene diene copolymer sealing joint strip; in the inlaying process, the proper clearance (2.5-3.5 mm) and compression amount (2-3 mm) are required to be reserved to ensure the strength and sealing performance of the inlaid structure.

Locking device 24: the main structure of the locking device is a cast steel lock body, a stainless steel triangular lock core, a stainless steel lock tongue and a locking plate. The specific implementation process comprises: the cast steel lock body, the stainless steel triangular lock core and the stainless steel lock tongue of the locking device 24 are inlaid inside the frame of the movable sash 21, and the locking plate is inlaid at the corresponding position of the outer frame 20; because the lock tongue is provided with a side opening, when the lock core drives the lock tongue to revolve into the locking plate, the locking limit to the movable sash 21 as well as the compression to the movable sash 21 can be realized, thereby realizing the good sealing effect among the movable sash 21, the outer frame 20 and the sealing joint strip 23.

Rotating device 26: the rotating device comprises an internal axle and a sleeve, wherein the internal axle is arranged on the cross beam in the middle of the window, and the sleeve is arrange on the frame of the movable sash 21. The section shape and the wall thickness of the rotating device 26 must meet the requirement of the rigidity and sealing performance of the entire window and the opening angle of the movable window. The implementation process comprises: the internal axle and the sleeve are formed by machining the matrix of the aluminum alloy profile. In addition, to ensure the fixation of the movable sash 21 when it is open, the rotating device 26 is also provided with a limit part so that the movable sash 21 can revolves and can be fixed at the position of 140-160 degrees.

Sealing device 23: the sealing device comprises a glass sealing joint strip, a sealing joint strip between the movable sash and the outer frame, a rainwater backflow groove and a backflow hole. The specific implementation process comprises: the sealing joint strip is mainly inlaid with the aluminum profile groove. The backflow groove and the backflow hole must be arranged at a reasonably position to realize the rainwater sealing performance.

Hereinafter, the sealing performance, the wind pressure resistance, the sound insulation, the thermal insulation, the modular structure and other performance indexes of the preferred embodiment are described:

Sealing performance: As air flow has larger vibration and air pressure when the passenger train is running, thereby the window requires reliable sealing. The solution of the present invention comprises: the double-layer sealing is adopted between the hollow tempered glass 25 and the aluminum alloy outer frame 20, and between the movable sash 21 and the aluminum alloy outer frame 20, the sealing device is the hollow thylene-propylene diene copolymer sealing joint strip. In addition, after the movable sash 21 is closed, the rotary compression type locking device 24 is used to ensure good air tightness and water tightness.

The contrast of air tightness and water tightness between the rescue passage window of the present invention and the traditional window is as follows:

|  | Rescue Passage Window of the present invention | Prior unit type aluminum alloy window |
|---|---|---|
| Air Tightness | $\leq 0.2$ (m$^3$/m · h) | 1.2 (m$^3$/m · h) – 2 (m$^3$/m · h) |
| Water Tightness | Leaking pressure $\geq 300$ Pa | Leaking pressure $\geq 250$ Pa |

Wind pressure resistance: as the movable sash 21 of the rescue passage window of the present invention is much larger than the traditional window, the rigidity and strength that the entire window bearing are required to be greatly improved to meet the wind pressure resistance when the train is running. The implementation process comprises: the aluminum alloy outer frame 20 is made of high strength aluminum profile, the window glass 25 is made of the double-layer hollow tempered glass, the rotating device 26 of the movable sash 21 is made of high strength thorough aluminum profile, and the high strength compressing and locking device 24 is arranged.

The contrast of wind pressure resistance between the rescue passage window of the present invention and the traditional window is as follows:

|  | Rescue Passage Window of the present invention | Prior unit type aluminum alloy window |
|---|---|---|
| Wind Pressure Resistance | $\geq 4$ KPa | $\geq 3$ KPa |

Sound insulation and thermal insulation: as the movable sash 21 of the rescue passage window of the present invention is much larger than the traditional window, the sound insulation and thermal insulation of the entire window are required to be strengthened structurally to meet the comfort requirement during the running of the train. The implementation process comprises: the hollow double-layer tempered glass 25 with an oversize hollow layer is used for the rescue passage window to strengthen the sealing performance after the movable sash 21 is closed, thereby reaching good sound insulation and thermal insulation effects.

The contrast of sound insulation and thermal insulation between the rescue passage window of the present invention and the traditional window is as follows:

|  | Rescue Passage Window of the present invention | Prior unit type aluminum alloy window |
|---|---|---|
| Sound Insulation | Sound insulation factor: $\geq 28$ dB(A) | Sound insulation factor: $\geq 25$ dB(A) |
| Thermal Insulation | $\leq 3.0$ (W/m$^2$k) | $\leq 3.5$ (W/m$^2$k) |

Modular design and installation art: for realizing the purpose of rapid installation, the rescue passage window of the present invention adopts the modular installation design structure to finish the rapid installation of rescue passage window and ensure that the train can be put into an emergency orders. As the sealant is used between the traditional window body and the steel structure for sealing, so that the application of sealant is limited by temperature and humidity, the sealant requires a long time to be dried, and the installation period for one single window is about 40 minutes. A special rubber sponge strip is used between the rescue passage window body and the steel structure of the present invention for sealing, and 16 rapid tightening blocks 28 are arranged inside the window to realize the rapid tightening of the entire window, so that the installation period of one single window is about 15 minutes.

The contrast of installation period between the rescue passage window of the present invention and the traditional window is as follows:

|  | Rescue Passage Window of the present invention | Prior unit type aluminum alloy window |
|---|---|---|
| Installation Period | $\leq 15$ minutes | $\geq 40$ minutes |

All embodiments in the specifications are described in a progressive way, each embodiment mainly describes the differences from other embodiments, and the same and similar parts among the embodiments can be referenced mutually.

The rescue passage window for the passenger train of the present invention is introduced above in detail, in the present invention the specific cases are used to explain the principle and embodiments of the invention, and the above description of embodiments is only used for helping people to understand the methods of the invention and its core concept; at the same time, to the skilled in the art, the embodiments and the application scope both can be changed based on the principle of the invention. In sum, the contents of the specifications should not be interpreted as limits to the present invention.

What is claimed is:

1. A rescue passage window for a passenger train, comprising an aluminum alloy outer frame, hollow tempered glass, a movable sash and a fixed sash, characterized in that it also comprises a locking device, a rotating device and a sealing device, wherein:
the aluminum alloy outer frame is a carrier to connect a structures of any other parts, the hollow tempered glass is inlaid on the aluminum alloy outer frame by the sealing device to form the fixed sash and the movable sash, the movable sash is suspended on a cross beam of the aluminum alloy outer frame by the rotating device to connect the movable sash with the aluminum alloy outer frame, the locking device locks reliably between the movable sash and the aluminum alloy outer frame, and the sealing device connects and seals between the movable sash and the aluminum alloy outer frame, wherein the locking device comprises a lock body, a lock core, a lock tongue and a locking plate; the lock body, the lock core and the lock tongue are inlaid inside a frame of the movable sash, and the locking plate is inlaid onto a corresponding position of the aluminum alloy outer frame; the lock tongue is provided with a side opening, locking and compressing the moveable sash when the lock core drives the lock tongue to revolve into the locking plate.

2. The rescue passage window for the passenger train according to claim 1, characterized in that the aluminum alloy outer frame is formed by extruding an aluminum alloy profile by a pressing machine; after aging treatment, four corners are bent by using a simmer bending mould; and finally a mouthpiece is welded and polished.

3. The rescue passage window for the passenger train according to claim 2, characterized in that the aluminum alloy outer frame is also provided with a tightening blocks for rapidly tightening the rescue passage window to the passenger train body.

4. The rescue passage window for the passenger train according to claim 1, characterized in that the hollow tempered glass comprises external tempered glass, a middle air layer and internal tempered glass, with thicknesses of 8 mm, 6 mm and 5 mm or 5 mm, 9 mm and 5 mm respectively; wherein the external tempered glass and the internal tempered glass are supported by an aluminum alloy molecular sieve on the edge and are adhered by a sealant, and a drying agent is arranged inside the aluminum alloy molecular sieve.

5. The rescue passage window for the passenger train according to claim 1, characterized in that the fixed sash and the movable sash comprise aluminum alloy frames, the hollow tempered glass and a glass sealing joint strip:
the aluminum alloy frames are formed by extruding an aluminum alloy profile by using a pressing machine, after aging treatment, four corners are bent by a simmer bending mould, and finally a mouthpiece is welded and polished;
the hollow tempered glass is inlaid onto the aluminum alloy frames through the glass sealing joint strip, wherein an inlaying clearance is 2.5 mm to 3.5 mm, and a preserved compression amount is 2 mm to 3 mm.

6. The rescue passage window for the passenger train according to claim 5, characterized in that a passing size after the movable sash is open is 970×600 mm.

7. The rescue passage window for the passenger train according to claim 1, characterized in that the rotating device comprises an internal axle and a sleeve, the internal axle is arranged on the cross beam in a middle of the window, the sleeve is arrange on the frame of the movable sash, and the internal axle and the sleeve are formed by machining a matrix of an aluminum alloy profile.

8. The rescue passage window for the passenger train according to claim 7, characterized in that the rotating device also comprises a limit part so that the movable sash can be revolved and can be fixed at a position of 140-160 degrees.

9. The rescue passage window for the passenger train according to claim 1, characterized in that the sealing device comprises a glass sealing joint strip and a sealing joint strip between the movable sash and the aluminum alloy outer frame; and the sealing joint strip is an ethylene-propylene diene copolymer sealing joint strip.

10. The rescue passage window for the passenger train according to claim 1, characterized in that the lock body is made of cast steel material; and the lock core, the lock tongue and the locking plate are made of stainless steel material.

\* \* \* \* \*